United States Patent
Konno

(10) Patent No.: US 6,768,219 B2
(45) Date of Patent: Jul. 27, 2004

(54) REMOTE LOCK OPERATION APPARATUS FOR LIGHT VEHICLE

(75) Inventor: Takeshi Konno, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 118 days.

(21) Appl. No.: 10/076,494

(22) Filed: Feb. 19, 2002

(65) Prior Publication Data

US 2002/0113490 A1 Aug. 22, 2002

(30) Foreign Application Priority Data

Feb. 19, 2001 (JP) ........................................ 2001-042273

(51) Int. Cl.$^7$ ............................................. B60K 28/00
(52) U.S. Cl. ........................ 307/9.1; 307/10.2; 343/713
(58) Field of Search ................................. 307/9.1, 10.2; 343/711, 712, 713

(56) References Cited

U.S. PATENT DOCUMENTS

| | | | |
|---|---|---|---|
| 4,022,487 A | | 5/1977 | Leahy |
| 4,132,994 A | * | 1/1979 | Caldwell .................... 343/713 |
| 4,907,428 A | * | 3/1990 | Nakashima et al. .......... 70/264 |
| 5,124,565 A | * | 6/1992 | Yoshida et al. ............ 340/5.61 |
| 5,291,761 A | * | 3/1994 | Lii ............................... 70/18 |
| 5,594,411 A | * | 1/1997 | Ono ........................ 340/425.5 |
| 5,648,764 A | * | 7/1997 | Nose et al. ................. 340/5.3 |
| 5,744,875 A | * | 4/1998 | Kleefeldt et al. .......... 307/10.2 |
| 5,945,794 A | | 8/1999 | Kitamura |
| 5,945,906 A | * | 8/1999 | Onuma ....................... 340/5.62 |
| 6,057,657 A | * | 5/2000 | Kitamura .................... 318/16 |
| 6,075,454 A | * | 6/2000 | Yamasaki .................. 340/5.61 |
| 6,232,884 B1 | * | 5/2001 | Gabbard ................... 307/10.2 |
| 6,236,307 B1 | * | 5/2001 | Kurano ................. 340/426.28 |
| 6,237,710 B1 | * | 5/2001 | Mori et al. ................. 180/219 |
| 6,483,467 B2 | * | 11/2002 | Kushida et al. ............. 343/713 |
| 6,515,580 B1 | * | 2/2003 | Isoda et al. ............... 340/425.5 |
| 2002/0190843 A1 | * | 12/2002 | Konno et al. ............... 340/5.64 |
| 2003/0007649 A1 | * | 1/2003 | Riggs ........................... 381/86 |
| 2003/0024754 A1 | * | 2/2003 | Konno et al. ............... 180/287 |
| 2003/0080859 A1 | * | 5/2003 | Tsuji ........................... 340/426 |

FOREIGN PATENT DOCUMENTS

| | | | | |
|---|---|---|---|---|
| DE | 29619966 | * | 6/1997 | ............ B62H/5/08 |
| EP | 0 886 125 A2 | | 12/1998 | |
| EP | 1232918 | * | 8/2002 | ........... B60R/25/00 |
| EP | 1232920 | * | 8/2002 | ........... B62R/25/00 |
| FR | 2 754 226 | | 4/1998 | |
| JP | 03-295777 | * | 12/1991 | ............ B62H/5/20 |
| JP | 04-166483 | * | 6/1992 | ............ B62H/5/02 |
| JP | 07-017445 | * | 1/1995 | ............ B62H/5/00 |
| JP | 07-165143 | * | 6/1995 | ............ B62H/5/00 |
| JP | 09-169289 | * | 6/1997 | ............ B62J/39/00 |
| JP | 10-196188 | * | 7/1998 | ............ B62H/5/00 |
| JP | 11-154913 | * | 6/1999 | ......... H04B/10/105 |
| JP | 2001-012122 | * | 1/2001 | ............ B62H/5/00 |
| JP | 2001-287681 | * | 10/2001 | ............ B62J/39/00 |
| JP | 2002-264874 | * | 9/2002 | ............ B62J/39/00 |
| JP | 2002-326561 | * | 11/2002 | ............ B62H/25/06 |

* cited by examiner

*Primary Examiner*—Gregory J. Toatley, Jr.
*Assistant Examiner*—Roberto J Rios
(74) *Attorney, Agent, or Firm*—Birch, Stewart, Kolasch & Birch, LLP

(57) ABSTRACT

A remote locking apparatus for a cabinless, light vehicle is disclosed having an infrared receiver. Even if only one infrared receiver is used for the vehicle in order to reduce the burden to a battery, a desirable range of directivity of the infrared receiver is maintained without being influenced by a vehicle seat or other portions of a vehicle body. A single infrared receiver (R) is disposed at an uppermost portion of a vehicle body in a preferred embodiment.

17 Claims, 5 Drawing Sheets

REMOTE LOCK OPERATION APPARATUS FOR LIGHT VEHICLE

CROSS-REFERENCES TO RELATED APPLICATIONS

This nonprovisional application claims priority under 35 U.S.C. § 119(a) on patent application Ser. No. 2001-042273 filed in Japan on Feb. 19, 2001, the entirety of which is herein incorporated by reference.

BACKGROUND OF THE INVENTION

1. Field of the Invention

The present invention relates to an apparatus for the remote locking of a light vehicle having no cabin. It is to be noted that the "light vehicle having no cabin" as described with reference to the present invention may be any of a two-wheel vehicle, a three-wheel vehicle and a four-wheel vehicle of the saddle-ride and the seated types, and may or may not include a prime mover. For example, a motorcycle, a scooter, a bicycle and so forth are included by the term two-wheeled vehicle.

2. Description of the Background Art

In a conventional motorcycle, scooter or the like, various locking mechanisms for preventing theft or mischief such as, for example, a main stand locking apparatus, a steering handle locking apparatus, a seat locking apparatus and so forth are provided at suitable locations on a vehicle body. These locking mechanisms can be typically locked and unlocked by a driver operating a key locking operation section provided on the vehicle body.

Meanwhile, in four-wheeled vehicles in recent years, an apparatus has been adopted that employs a door locking mechanism that can be locked and unlocked without a key by means of a remote locking operation using an infrared signal. However, in the conventional, aforementioned apparatus, several infrared receivers are discretely disposed at suitable locations on a vehicle in order to assure a wide angle of directivity for an infrared signal.

Thus, it is possible to lock and unlock the locking mechanism for a light vehicle such as a motorcycle having no cabin without a key by means of a remote lock operation apparatus using an infrared signal. In this instance, since the capacity of a battery incorporated within a light vehicle is different from that of a four-wheel automobile, if several infrared receivers are used simultaneously as in a four-wheel automobile, then the total standby current is excessively high when compared with the battery capacity. This may give rise to frequent occurrences of excessive battery consumption/drain, thereby resulting in failure in starting of the engine, damage to the durability of the battery, and so forth.

Meanwhile, the directivity required for an infrared receiver for a light vehicle is generally within the range of 45 degrees on the left and the right sides with respect to a longitudinal center line of the vehicle body. As seen in FIG. 1, when viewed rearwardly from the position of the left and right handle grips of the vehicle in the forward and backward direction of the vehicle body, the range of a single infrared receiver is limited as shown when the convenience of using the receiver is taken into consideration during periods such as when an operator is seated on the vehicle, when opening/closing of the seat and so forth. Accordingly, the mounted position of the Infrared receiver is preferably set to such a position at which the receiver can cover at least the aforementioned directivity range without being influenced by the seat or a rear portion of the vehicle body.

SUMMARY OF THE INVENTION

The present invention overcomes the shortcomings associated with the background art and achieves other advantages not realized by the background art.

It is an object of the present invention to provide a remote lock operation apparatus for a light vehicle which satisfies the requirements described above and is relatively simple in structure.

It is an additional object of the present invention to provide a remote locking apparatus for a light vehicle that is relatively small in size and reduces power consumption.

These and other objects are accomplished by a remote locking system for a cabinless, light vehicle having a vehicle body, the apparatus comprising a portable infrared transmitter; an infrared receiver being capable of receiving an infrared signal emitted from the infrared transmitter, wherein the infrared receiver consists of a single infrared receiver disposed along an uppermost portion of the vehicle body; a lock actuator being capable of locking and unlocking at least one lock mechanism being incorporated in the vehicle body; and a control apparatus for controlling an operation of the lock actuator based on the infrared signal received by the infrared receiver.

These and other objects are further accomplished by a remote locking system for a cabinless, light vehicle having a vehicle body, the apparatus comprising a portable infrared transmitter; an infrared receiver being capable of receiving an infrared signal emitted from the infrared transmitter, the infrared receiver disposed along an uppermost portion of the vehicle body, wherein the vehicle body includes a transparent windshield plate extending upwardly at a front end portion of an upper face of a handle cover for a steering shaft; a lock actuator being capable of locking and unlocking at least one lock mechanism being incorporated in the vehicle body; and a control apparatus for controlling an operation of the lock actuator based on the infrared signal received by the infrared receiver, the infrared receiver being connected to the control apparatus through wiring cable extending along a peripheral edge of the windshield plate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
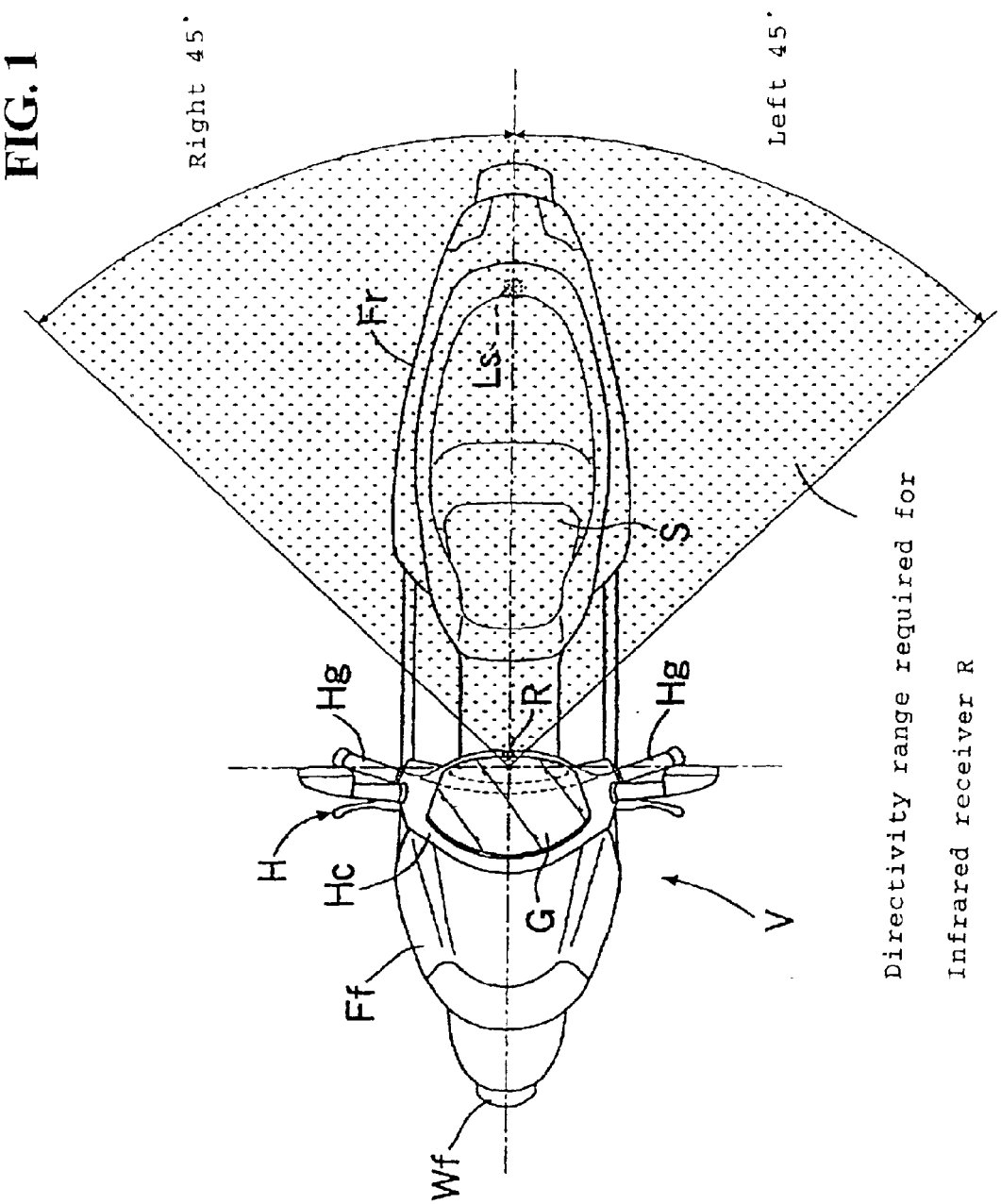
FIG. 1 is a plan view of a scooter according to a first embodiment of the present invention.
Figure 2:
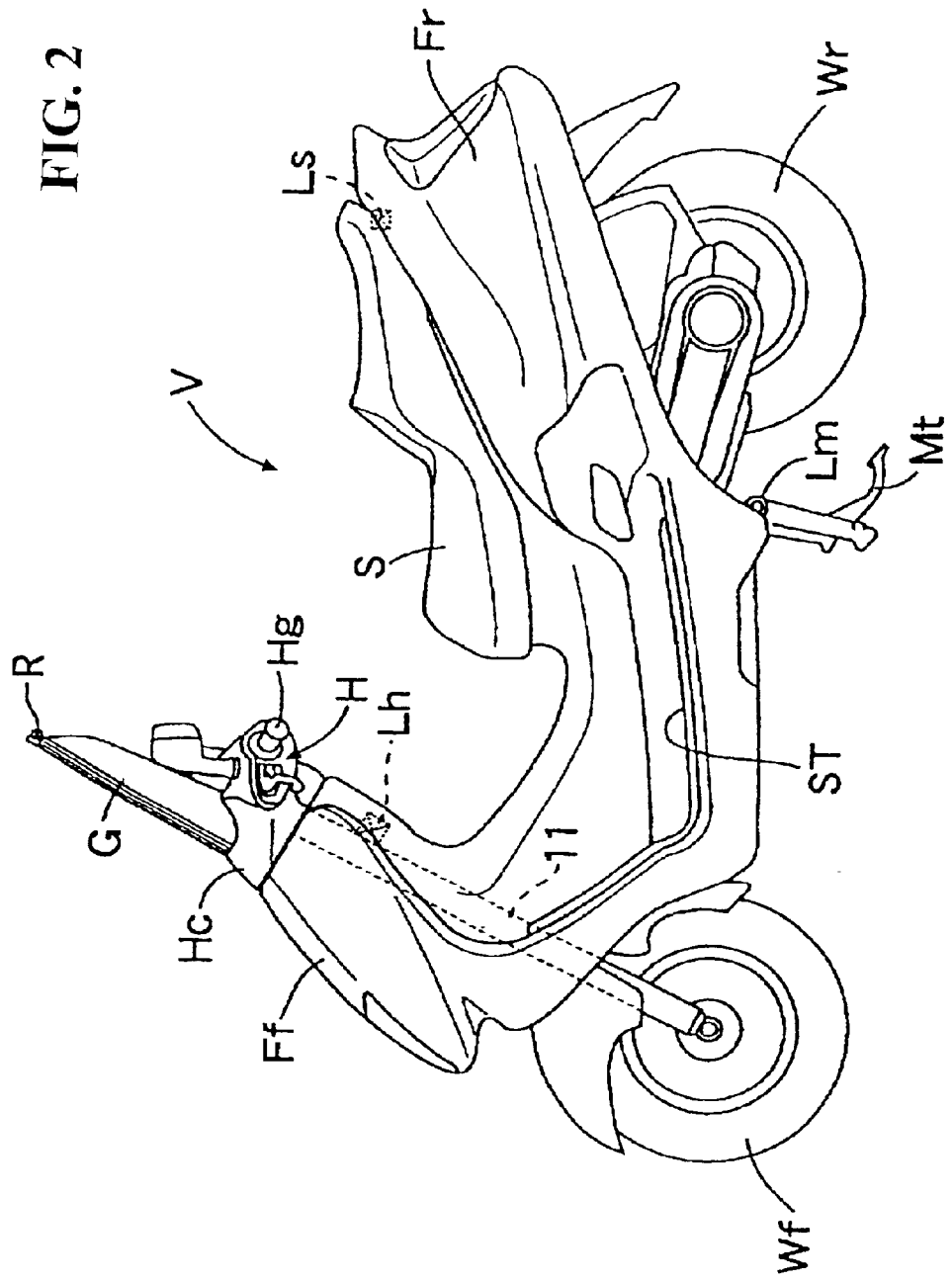
FIG. 2 is a side elevational view of a scooter according to an embodiment of the present invention.
Figure 3:
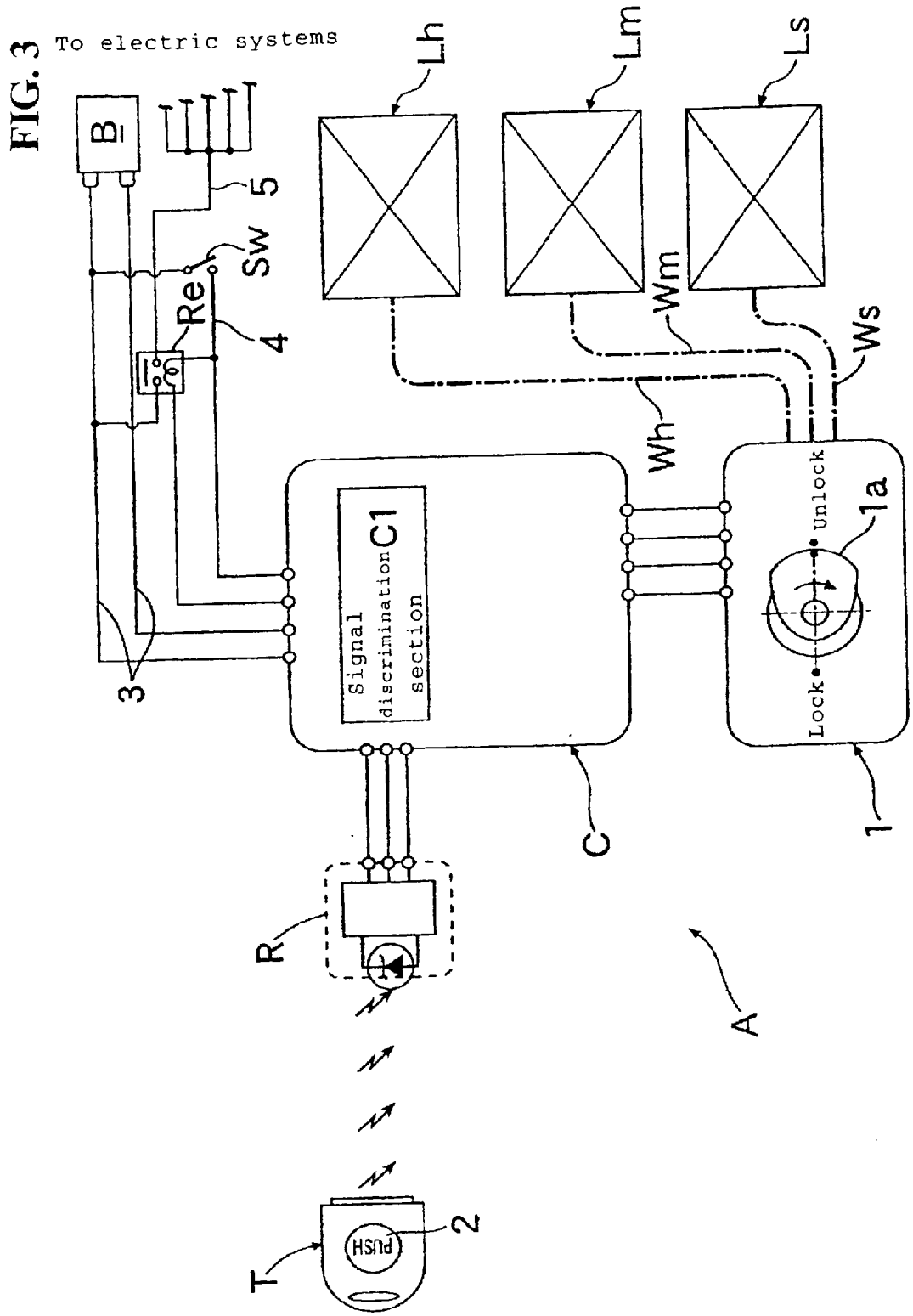
FIG. 3 is a schematic block diagram of a remote locking apparatus according to an embodiment of the present invention.

The present invention will hereinafter be described with reference to the accompanying drawings. In the accompanying drawings, FIGS. 1 to 3 show a first embodiment wherein the present invention is applied to a scooter. FIG. 1 is a plan view of a scooter according to a first embodiment of the present invention. FIG. 2 is a side elevational view of a scooter according to an embodiment of the present invention. FIG. 3 is a schematic block diagram of a remote locking apparatus according to an embodiment of the present invention.

Figure 4:
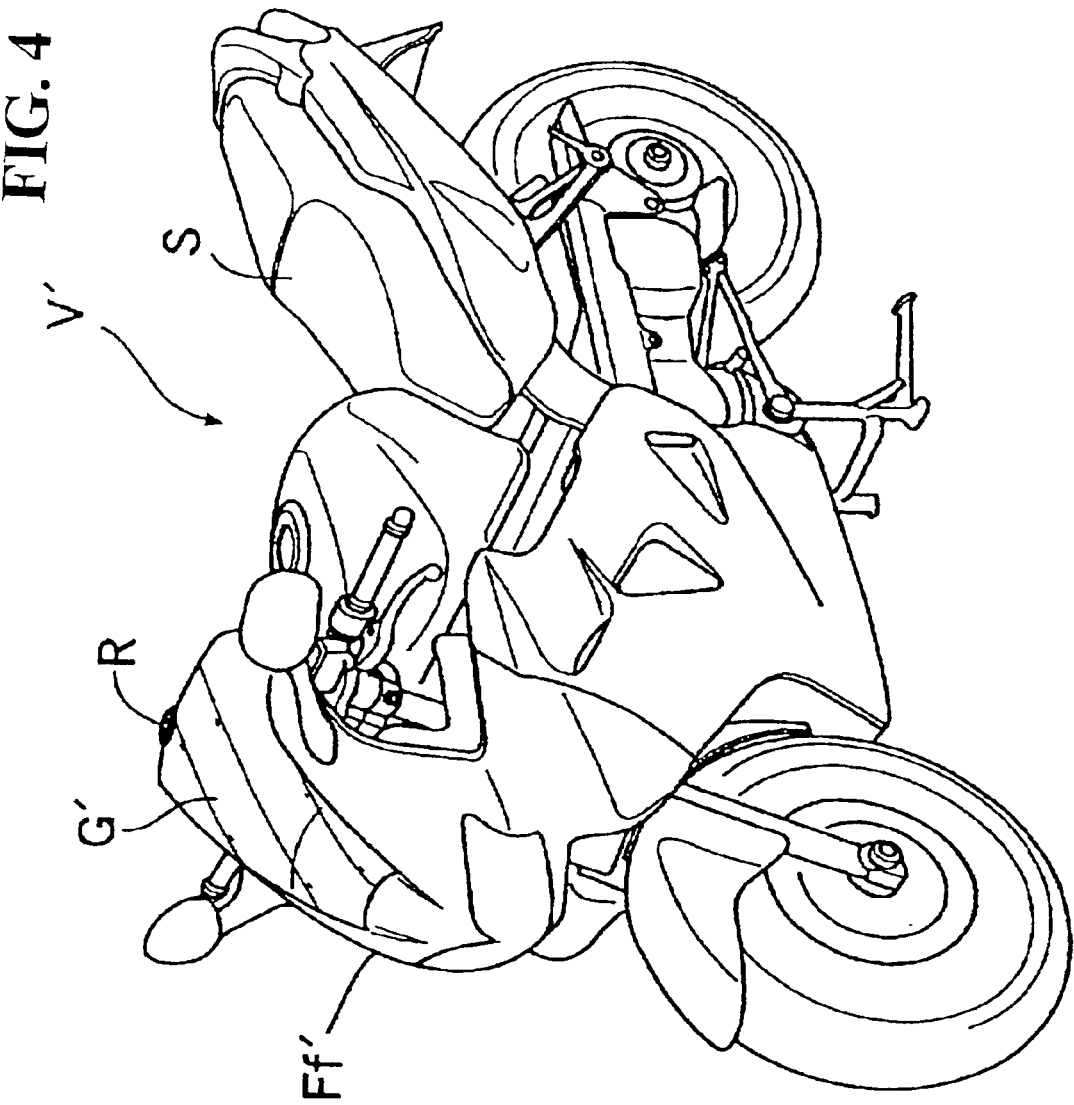
FIG. 4 is a perspective view of a motorcycle according to a second embodiment of the present invention.
Figure 5:
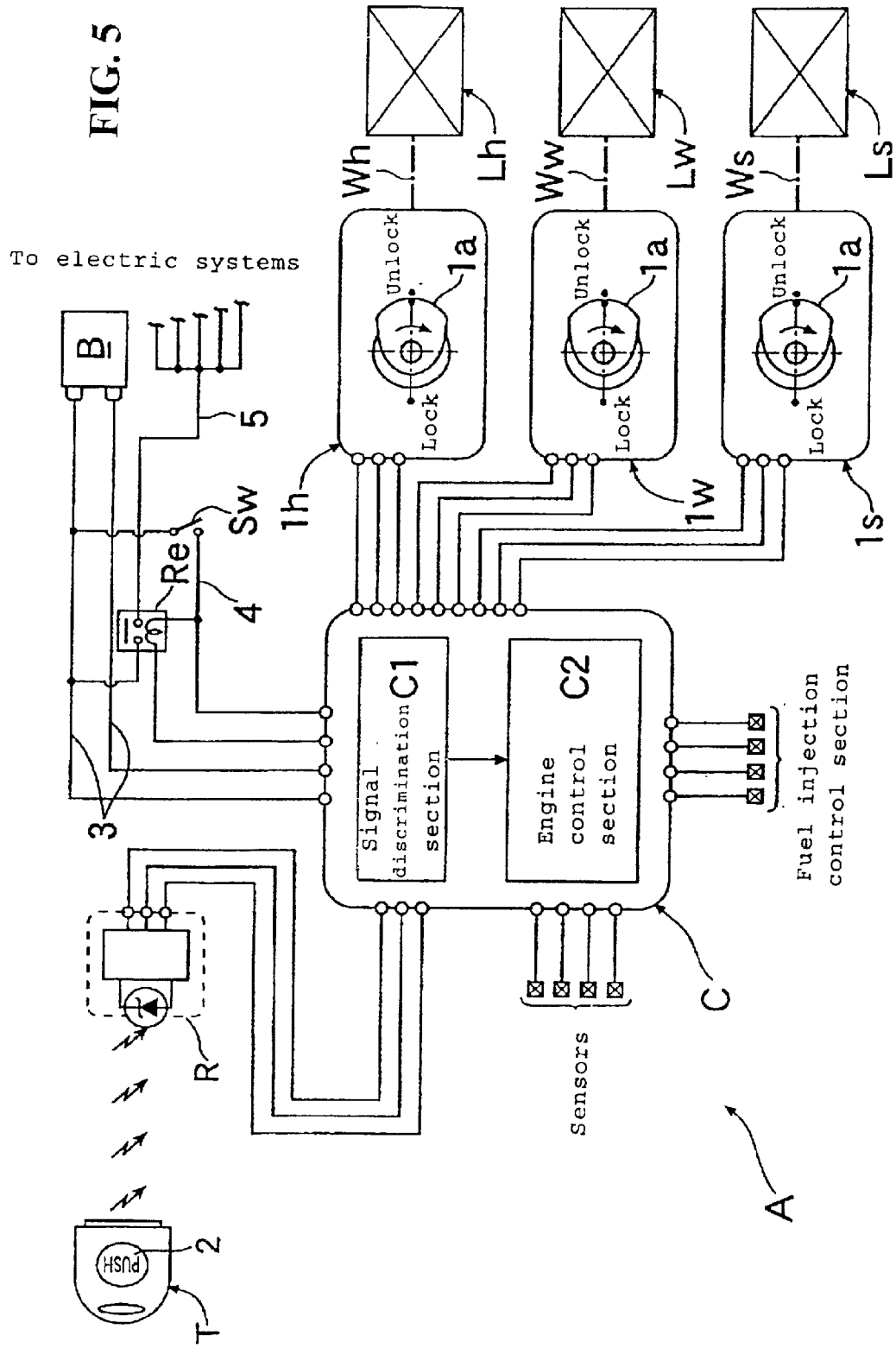
FIG. 5 is a schematic block diagram of a remote locking apparatus according to the second embodiment of the present invention.

Meanwhile, FIGS. 4 and 5 show a second embodiment wherein the present invention is applied to a motorcycle. FIG. 4 is a perspective view of a motorcycle according to a second embodiment of the present invention. FIG. 5 is a schematic block diagram of a remote locking apparatus according to the second embodiment of the present invention.

In the first embodiment shown in FIGS. 1 to 3, a scooter V as a light vehicle having no cabin includes a step ST provided between front and rear wheels Wf and Wr for receiving the feet of the driver placed thereon. A seat S on which the driver should be seated is disposed at an upper portion of a rear body cover Fr made of metal or synthetic resin. A vehicle body rear portion is erected uprightly from a rear end of the step ST. A baggage accommodating seat box (not shown) is disposed in the rear body cover Fr, and the seat S is mounted on the seat box or the like such that the seat S can be opened and closed between a closing position at which the seat covers an open end of the seat box and an opening position.

Further, the scooter V includes a bar handle H operable for steering the front wheel Wf through a steering shaft 11. The steering shaft 11 is supported for rotation on a head pipe of a vehicle body front frame (not shown) and extends in an upward and downward, rearwardly inclined posture on the inner side, e.g. on the rear side of a front body cover Ff made of metal or synthetic resin as the vehicle body front portion. A lower portion of the steering shaft 11 is formed in a bifurcated fork for supporting the front wheel Wf for rotation. An upper end of the steering shaft 11 is coupled to a central portion of the bar handle H such that the bar handle H and the steering shaft 11 are turned integrally in accordance with a steering operation.

The central portion of the bar handle H and the upper end portion of the steering shaft 11 are covered in good appearance with a T-shaped handle cover Hc made of synthetic resin or metal which is turned integrally with them. Left and right handle grips Hg at the opposite ends of the bar handle H extend outwardly from the opposite left and right end portions of the handle cover Hc.

A transparent windshield plate G is erected uprightly and integrally at a front end portion of an upper face of the handle cover Hc such that it stands in a rearwardly inclined relationship above the handle cover Hc. An infrared receiver (R) which is hereinafter described is provided and fixed at an uppermost portion of the windshield plate G (in the example shown, at a central portion of an upper edge portion of the plate G in the leftward and rightward direction), e.g., at an uppermost portion of the vehicle body such that a reception face thereof is directed at least rearwardly. A wiring cable (not shown) is laid at a suitable location of the windshield plate G and is connected to the Infrared receiver (R), e.g., along a peripheral edge portion of the windshield plate G and is connected to an electronic control circuit C which is hereinafter described.

Further, a handle lock mechanism Lh for controlling pivotal motion of the handle H upon parking, a stand lock mechanism Lm for locking a main stand Mt, and a seat lock lock mechanism L are also provided on the vehicle body of the scooter V. The stand lock mechanism Lm can be pivoted between an upright position and a horizontally accommodated position. The seat lock mechanism Ls locks the seat S at the closing position at which the seat S covers the open upper end of the seat box described above. Since the structure of the lock mechanisms Lh, Lm and Ls are conventionally known, description of the detailed structure of these features is omitted hereinafter.

Operation wires Wh, Wm and Ws extend from the lock mechanisms Lh, Lm and Ls, respectively, and a single common electrically driven lock actuator 1 for locking and unlocking the lock mechanisms Lh, Lm and Ls through the operation wires Wh, Wm and Ws is provided at a suitable location on the vehicle body. The lock actuator 1 forms part of a remote locking apparatus A of the present invention and performs a locking or an unlocking operation in accordance with an instruction signal from an electronic control circuit C. The electronic control circuit C is a control apparatus provided at a suitable location of the vehicle body to lock or unlock the lock mechanisms Lh, Lm and Ls without a key.

The remote locking apparatus A mentioned above includes, in addition to the lock actuator 1 and the electronic control circuit C, an infrared transmitter T of a small size which can be carried by the driver, and an infrared receiver (R) disposed at the uppermost portion of the windshield plate G so that it can receive an infrared signal emitted from the transmitter T. An operation switch 2 operable for inputting locking or unlocking signals is provided for the transmitter T, and a signal transmission section (not shown) capable of transmitting an infrared signal corresponding to a particular ID code in response to an operation input for the switch 2 is built in the transmitter T. It is to be noted that such a structure of the infrared transmitter as just described is conventionally known in the art.

The electronic control circuit C includes a signal discrimination section C1 including a CPU and a memory. The signal discrimination section C1 includes an ID verification section for verifying and discriminating whether or not an infrared signal received by the infrared receiver (R) is legal, that is, whether or not the ID code of the received signal coincides with a particular ID code stored in advance. The signal discrimination section C1 also includes an instruction signal outputting section for outputting an operation instruction signal to the lock actuator 1 in response to the the verification section's determination that the received signal is a legal infrared signal (that the ID code exhibits coincidence).

Further, a first energization circuit 3 for supplying power for a battery B to the electronic control circuit C and a relay circuit 4 having a main switch Sw and a main relay Re are connected to the electronic control circuit C. The relay circuit 4 opens or closes a second energization circuit 5. The relay circuit 4 interconnects the battery B and various electrical systems (including an engine starting circuit) incorporated in the vehicle, to effect energization control of the electric systems.

Operation of the embodiment described above is described hereinafter. It is assumed now that the scooter V is in a parking state and the lock actuator 1 is in a locking operative state so that the handle lock mechanism Lh, stand lock mechanism Lm and seat lock mechanism Ls are all held in a locking state. If an infrared signal is emitted from the infrared transmitter T toward the infrared receiver (R) and is received by the infrared receiver (R), then the signal discrimination section C1 of the electronic control circuit C verifies and discriminates whether or not the received signal is valid. The signal is evaluated to determine if the ID code of the received signal coincides with the particular ID code stored in advance.

If it is determined that the received signal is a valid infrared signal (if the ID code exhibits coincidence), then the signal discrimination section C1 outputs an operation instruction signal to the lock actuator 1 so that the actuator 1 is switched from the locking state into an unlocking state. The handle lock mechanism Lh, stand lock mechanism Lm and seat lock mechanism Ls are unlocked at that time. The electronic control circuit C simultaneously controls the main relay Re to provide an energization permission state.

Thus, if the main switch Sw is switched from off to on, then the main relay Re can be switched on, and energization of all of the electric systems is enabled, including the engine starting circuit. Accordingly, if a starter switch (not shown) is switched on in this state, then the engine starting circuit can be energized to start the engine. Then, upon completion of the starting of the engine, the scooter V is placed into a state wherein it can travel.

In order to stop the engine that is in an operating state, the main switch Sw is switched from On to Off. Consequently, the energization of the electric systems of the engine is interrupted, and the engine stops. If an infrared signal is transmitted from the infrared transmitter T to the infrared receiver (R) again, then the signal discrimination section C1 of the electronic control circuit C verifies and discriminates whether or not the received signal is valid/legal in such a manner as described above.

If it is determined that the received signal is a legal infrared signal, then the signal discrimination section C1 outputs an operation instruction signal to the lock actuator 1 to switch the lock actuator 1 from the unlocking state to the locking state. Consequently, the handle lock mechanism Lh, stand lock mechanism Lm and seat lock mechanism Ls are locked at that time. The electronic control circuit C simultaneously controls the main relay Re to an energization inhibition state. Therefore, even if the main switch Sw is switched on, the main relay Re is not turned on.

Since the single infrared receiver (R) of the remote locking apparatus A described above is used for one vehicle, even if the capacity of the battery B carried on the vehicle is considerably small when compared with the capacity of a battery for a four-wheeled automobile, the total standby current of the infrared receiver (R) can be reduced to such a level that very little energy from the batter is required. Consequently, failure in starting of the engine caused by consumption of the battery can be prevented, and the durability of the battery B can be raised.

Further, the directivity required for the infrared receiver (R) for the scooter V generally is within the range of 45 degrees on the left and the right with respect to a longitudinal center line of the vehicle body as viewed rearwardly from the position of the left and right handle grip parts Hg of the vehicle body as seen in FIG. 1. Accordingly, the mounted position of the infrared receiver (R) is preferably set to such a position at which the receiver (R) can cover at least the directivity range described above without being influenced by the seat S or the vehicle body rear portion. However, since the only one infrared receiver (R) is disposed at the uppermost portion of the vehicle body (e.g., the windshield plate G as in the present embodiment), there is no obstacle to reception around the receiver (R) and the reception performance of the receiver (R) is raised. The range of directivity of the infrared receiver (R) required for the scooter V can be covered readily without being influenced by the seat S or the vehicle body.

A second embodiment wherein the present invention is applied to a motorcycle is shown in FIGS. 4 and 5. In the present embodiment, a single infrared receiver (R) is disposed and fixed at an upper edge portion (in the example shown, at a mid portion in the leftward and rightward direction) of a transparent windshield plate G'. The transparent windshield plate G' is incorporated integrally on a front cowl Ff which forms a vehicle body front portion of the motorcycle V' such that a reception face thereof is directed at least rearwardly.

Further, a wheel lock mechanism Lw for locking rotation of a wheel is provided in place of the stand lock mechanism Lm of the preceding embodiment. The wheel lock mechanism Lw, handle lock mechanism Lh and seat lock mechanism Ls are locked and unlocked by means of lock actuators 1w, 1h and 1s for exclusive use, respectively. Accordingly, the lock actuators 1w, 1h and 1s can be disposed in the proximity of the corresponding lock mechanisms Lw, Lh and Ls and can effectively drive their respective mechanisms.

Further, the electronic control circuit C as a control apparatus for the remote locking apparatus A includes, in addition to the signal discrimination section C1, an engine control section C2 for electronically controlling the engine in response to various operation states and operation conditions. The engine control section C2 outputs, in the example shown, a control signal to a fuel injection control section for the engine in order to control the fuel injection amount of the engine in response to detection signals of a water temperature sensor and other various engine controlling sensors. In the second embodiment, the configuration of the remote locking apparatus A is similar to that of the preceding embodiment. In addition, the operation and effects similar to those of the preceding embodiment are also achieved.

While the embodiments of the present invention are described in detail, the present invention is not limited to the embodiments described above and various small changes and variations are anticipated. For example, in the aforementioned embodiments, a plurality of lock mechanisms Ls, Lh, Lm and Lw provided at a plurality of locations of a vehicle can be remotely and collectively operated. However, it will be appreciated that only some of the lock mechanisms Ls, Lh, Lm and Lw may be operated remotely and/or combinations of remote and individual locking operation can be designed in accordance with the spirit and scope of the present invention.

Further, the top of the windshield plate G or G' is given as an example of the uppermost portion of the vehicle body at which the infrared receiver (R) is to be provided. However, if a vehicle body part (for example, a back mirror) other than a windshield plate is provided at an uppermost position of a vehicle, then an infrared receiver may be disposed at the uppermost portion of the vehicle body part.

As described above, according to the present invention, in a light vehicle having no cabin, only one infrared receiver for a remote locking operation apparatus is used for a vehicle. Therefore, the standby current of the infrared receiver can be reduced to a level with which consumption of a battery carried on the vehicle does not occur even if the capacity of the battery is small. Consequently, the durability of the battery is raised and failures in engine starting can be prevented. Since only one infrared receiver is provided at the uppermost portion of the vehicle body, there is no obstacle to reception around the receiver and the reception performance of the receiver is raised. The range of directivity (angular reception range of the receiver) of the infrared receiver required for a light vehicle of the type described can be covered readily without being influenced by the seat or the vehicle body.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A remote locking system for a cabinless, light vehicle having a vehicle body, said apparatus comprising:
   a portable infrared transmitter;
   an infrared receiver being capable of receiving an infrared signal emitted from said infrared transmitter, wherein said infrared receiver consists of a single infrared receiver disposed above a handle of the vehicle body and along an uppermost portion of the vehicle body, wherein said uppermost portion of said vehicle body is a windshield plate extending from a front portion of said vehicle body or a mirror, and said single infrared receiver is disposed alone an upper edge of said windshield plate or said mirror;
   a lock actuator being capable of locking and unlocking at least one lock mechanism being incorporated in the vehicle body; and
   a control apparatus for controlling an operation of said lock actuator based on the infrared signal received by said infrared receiver.

2. The remote locking system according to claim 1, said windshield plate extending upwardly from a handle cover.

3. The remote locking system according to claim 1, said single infrared receiver being disposed along the upper edge of said windshield plate.

4. The remote locking system according to claim 1, wherein said uppermost portion of said vehicle body is a mirror.

5. The remote locking system according to claim 1, wherein said at least one lock mechanism includes a handle lock mechanism for controlling a pivotal motion of a handle when parking the vehicle, a stand lock mechanism for locking a main stand, and a seat lock mechanism provided on the vehicle body.

6. A remote locking system for a cabinless, light vehicle having a vehicle body, said apparatus comprising:
   a portable infrared transmitter;
   an infrared receiver being capable of receiving an infrared signal emitted from said infrared transmitter, said infrared receiver disposed along an uppermost portion of the vehicle body, wherein said vehicle body includes a transparent windshield plate extending upwardly at a front end portion of an upper face of a handle cover for a steering shaft;
   a lock actuator being capable of locking and unlocking at least one lock mechanism being incorporated in the vehicle body; and
   a control apparatus for controlling an operation of said lock actuator based on the infrared signal received by said infrared receiver, said infrared receiver being connected to said control apparatus through a wiring cable extending along a peripheral edge of the windshield plate.

7. The remote locking system according to claim 6, wherein said control apparatus includes an electronic control circuit.

8. The remote locking system according to claim 6, wherein said at least one lock mechanism includes a handle lock mechanism for controlling a pivotal motion of a handle when parking the vehicle, a stand lock mechanism for locking a main stand, and a seat lock mechanism provided on the vehicle body.

9. The remote locking system according to claim 5, further comprising:
   a plurality of operation wires extending from the locking mechanisms; and
   said lock actuator consisting of a single electrically driven lock actuator for locking and unlocking said locking mechanisms and connected to said operation wires.

10. The remote locking system according to claim 8, further comprising:
    a plurality of operation wires extending from the locking mechanisms; and
    said lock actuator consisting of a single electrically driven lock actuator for locking and unlocking said locking mechanisms and connected to said operation wires.

11. The remote locking system according to claim 5, said transmitter including an operation switch operable for inputting locking or unlocking signals, and a signal transmission section capable of transmitting an infrared signal corresponding to a particular ID code in response to an operation input for the switch.

12. The remote locking system according to claim 6, said transmitter including an operation switch operable for inputting locking or unlocking signals, and a signal transmission section capable of transmitting an infrared signal corresponding to a particular ID code in response to an operation input for the switch.

13. The remote locking system according to claim 7, said electronic control circuit including a signal discrimination section having a CPU and a memory.

14. The remote locking system according to claim 13, said transmitter including an operation switch operable for inputting locking or unlocking signals, and a signal transmission section capable of transmitting an infrared signal corresponding to a particular ID code in response to an operation input for the switch.

15. The remote locking system of claim 14, wherein the signal discrimination section includes an ID verification section for verifying and discriminating if an infrared signal received by the infrared receiver is valid by verifying that the particular ID code of the received signal coincides with a particular ID code stored in advance in the ID verification section.

16. The remote locking system of claim 15, further comprising a first energization circuit for supplying power for a battery to the electronic control circuit and a relay circuit having a main switch and a main relay connected to the electronic control circuit, wherein the relay circuit opens or closes a second energization circuit.

17. The remote locking system according to claim 6, wherein said infrared receiver consists of a single infrared receiver.

* * * * *